(12) United States Patent
Platt

(10) Patent No.: US 9,379,759 B2
(45) Date of Patent: Jun. 28, 2016

(54) MAGNETIC CASE FOR AN ELECTRONIC DEVICE

(71) Applicant: Ryan Platt, Manitou Springs, CO (US)

(72) Inventor: Ryan Platt, Manitou Springs, CO (US)

( * ) Notice: Subject to any disclaimer, the term of this patent is extended or adjusted under 35 U.S.C. 154(b) by 0 days.

(21) Appl. No.: 14/695,682

(22) Filed: Apr. 24, 2015

(65) Prior Publication Data
US 2016/0020810 A1    Jan. 21, 2016

Related U.S. Application Data

(60) Provisional application No. 62/025,023, filed on Jul. 16, 2014.

(51) Int. Cl.
*H04M 1/00* (2006.01)
*H04B 1/3888* (2015.01)

(52) U.S. Cl.
CPC ..................... *H04B 1/3888* (2013.01)

(58) Field of Classification Search
CPC .... H04B 1/3888; H04B 1/3833; H04B 1/385; H04B 1/38; H04M 1/0283; H04M 1/18; H04M 1/0214; H04M 1/0216; H04M 1/0245; H04M 1/0262
USPC .............. 455/550.1, 575.1, 575.8, 90.1, 90.2, 455/90.3
See application file for complete search history.

(56) References Cited

U.S. PATENT DOCUMENTS

| 4,858,798 A * | 8/1989 | Siddoway ................ A45F 5/02 224/240 |
| 6,888,940 B1 | 5/2005 | Deppen |
| 2014/0069736 A1 | 3/2014 | Freshman et al. |
| 2014/0091939 A1 | 4/2014 | Won et al. |
| 2014/0159839 A1* | 6/2014 | Kim ..................... H04B 1/3888 335/219 |
| 2015/0055284 A1* | 2/2015 | Han ....................... G06F 1/1616 361/679.12 |

FOREIGN PATENT DOCUMENTS

| CN | 201113995 | 9/2008 |
| CN | 202722871 U | 2/2013 |
| WO | 2013086481 A1 | 6/2013 |

OTHER PUBLICATIONS

2014 Hot sell Acoustic Amplifier Case for iphone 5 voice amplifier case. <http://yoyoliang.en.hisupplier.com/product-1677690-2014-Hot-sell-Acoustic-Amplifier-Case-for-iphone-5-voice-amplifier-case.html> HiSupplier.com Online Inc. pp. 1-6.

(Continued)

*Primary Examiner* — Nhan Le
(74) *Attorney, Agent, or Firm* — Mollborn Patents, Inc.; Fredrik Mollborn

(57) ABSTRACT

A case for an electronic device having a front face, a rear face, a top edge, a bottom edge, and two side edges. The case includes a body, a metal tab, one or more permanent magnets and one or more removable magnets. The body covers at least a portion of the rear face of the electronic device, and has several fastening portions configured to fasten the mobile device to the case. The metal tab is insertable through a slot in the body to rest between the body and the electronic device when inserted through the slot. The one or more permanent magnets that are permanently attached to the body. At least one removable magnet is configured to attach by a magnetic force to the metal tab when the metal tab is inserted into the slot, thereby holding the removable magnet in place with respect to the body.

12 Claims, 5 Drawing Sheets

(56) References Cited

OTHER PUBLICATIONS

Magnetic Phone Holder w/Hanging Clip. <http://www.alternativewireless.com/magnetic-cellphone-holder-clip.html>. Downloaded Feb. 23, 2015. 3 pp.

New Magnetic Smart Leather Skin Case Cover for Apple iPad 2 Chec. <http://www.vasski.com/new-magnetic-smart-leather-skin-case-cover-for-apple-ipad-2-chec-p-522.html#.Vlg8rTGUdlk>. Copyright © 2014 www.vasski.com. 2 pp.

* cited by examiner

MAGNETIC CASE FOR AN ELECTRONIC DEVICE

BACKGROUND

The present invention relates to cases for holding electronic devices, such as cell phones and the like. Today's cell phones are becoming increasingly technically complex and often include components and applications that allow users to perform tasks other than simple voice communication with other users. One example of a common feature of modern cell phones is a small cell phone camera, which can be used to take pictures or to record video, either for later viewing or for use, for example, in a live video conference with another cell phone or computer user.

It has also become common in the past few years for users to use their cell phone cameras to take so-called "selfies" of themselves. A "selfie" can be described as a picture of the user in some environment that the user would like to document. When taking a selfie, it may sometimes be necessary to put the cell phone down, in order to compose as nice of a picture as possible. However, this may sometimes be problematic, as cell phone users often have no way to attach their phone to the material on which the cell phone rests (e.g., brick, glass, metal, tree branches, etc.) and at different angles. Therefore, it is often necessary to prop the cell phone up, often in precarious ways, and thereby risking damaging the cell phone if it were to fall. Similarly, users typically cannot attach their cell phone to their clothes for hands-free action, such as video conferencing, talking, and adventure filming. For example, they cannot connect their cell phone to their belt without the assistance of a belt clip.

In situations when the cell phone is used for viewing video, either in the form of a pre-recorded movie, or during a live video chat, it may be desirable to angle the cell phone to avoid glare, etc., or to rotate the cell phone to a particular angle. This is currently not possible without the aid of a docking station. Thus, there is a need for a more versatile case for a cell phone that may enable some or all of these features.

SUMMARY

According to one embodiment of the present invention, a case is provided for an electronic device having a front face, a rear face, a top edge, a bottom edge, and two side edges. The case includes a body, a metal tab, one or more permanent magnets and one or more removable magnets. The body covers at least a portion of the rear face of the electronic device, and has several fastening portions configured to fasten the mobile device to the case. The metal tab is insertable through a slot in the body to rest between the body and the electronic device when inserted through the slot. The one or more permanent magnets that are permanently attached to the body. At least one removable magnet is configured to attach by a magnetic force to the metal tab when the metal tab is inserted into the slot, thereby holding the removable magnet in place with respect to the body.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Overview

The various embodiments of the invention seek to overcome the above deficiencies by providing a cell phone case that includes one or more magnets, which can attach either to other magnets or to some kind of magnetic surface.

In one embodiment, the cell phone case includes two magnets and a "shoehorn-like" piece of sheet metal, hereinafter referred to as a "metal tab." One of the magnets is permanently attached to the cell phone case. The other magnet and the metal tab are removable to work in various configurations with the attached magnet, for example, to prop up the cell phone on some kind of flat surface or to attach the cell phone to various objects, as will be described in further detail below.

It should be noted that while the various embodiments of the case is described by way of example and with reference to a cell phone case, the same principles can be used for a variety of cases having various dimensions and shapes that are configured to hold a device, such as, for example, a personal digital assistant (PDA), a digital music player, a tablet computer or a digital camera, just to mention a few examples.

It should be further noted that while the exemplary description below uses a preferred embodiment of a case with two magnets and a metal tab, other configurations are possible. For example, in some embodiments there may only be one magnet and a metal tab. In other embodiments, there may be two magnets only and no metal tab. In yet other embodiments, there may be a single magnet only. Yet further embodiments may contain multiple magnets arranged in various configurations. For example, a case for a tablet computer may need more magnets than a case for a cell phone in order to support the heavier weight of the tablet computer. In some embodiments, thicker magnets can be used to provide more magnetic force, such that magnets can be attracted to each other through thicker materials, like helmets, scuba diving suits, etc. Thus, many modifications to the embodiments described herein can be made by people having ordinary skill in the art.

Exemplary Description of a Cell Phone Case

Figure 1:
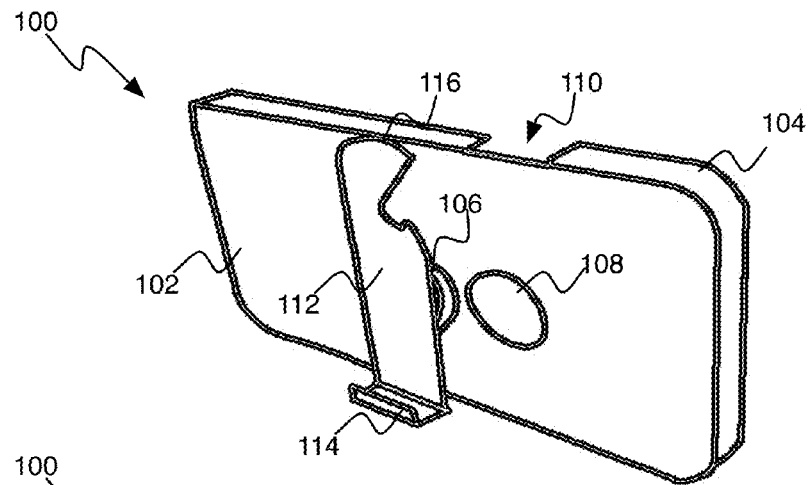
FIG. 1 shows a cell phone case in accordance with one embodiment, in which the cell phone case stands up at a first angle.

As can be seen in FIG. 1, in one embodiment, a cell phone case (100) having the features described above includes a back surface (102) and side surfaces (104) that are designed to hold the cell phone. The back surface has a permanent magnet (106) and an opening (108) for holding a detachable magnet (not shown). The side surface (104) has a slot (110) into which a metal tab (112) can be placed when not in use. FIG. 1 shows a schematic image of the cell phone case when the metal tab (112) is removed from the slot (110) in order to serve as a support for the cell phone case when standing the cell phone case up on one of its side surfaces (104), for example, for watching a movie or having a video conference.

In one embodiment, the permanent magnet (106) and the detachable magnet are neodymium iron boron magnets. However, it should be realized that this is merely one example and that many different types of magnets, or combinations of different types of magnets, can be provided that have similar properties to the neodymium iron boron magnets. It should also be noted that while the drawings show magnets having a circular or disk shape, they can have essentially any shape, e.g., square, hexagonal, etc. that may be appealing to a user. Further, the magnets can have various types of coating, such as nickel, silver or gold plating, or simply be painted with various colors and/or patterns.

In the illustrated embodiment, the metal tab (112) has a hook (114) on one of its ends, which allows the metal tab to be used for hanging the cell phone case (100) from a variety of surfaces, as will be described in further detail below, or to use as a "foot" when standing the cell phone case up on its side as shown in FIG. 1. Further, in the illustrated embodiment, the metal tab (112) has a cutout (116) at the other end of the metal tab (112), such that the metal tab (112) can be used, for example, as a bottle opener. As the skilled person realized, a bottle opener is merely one of a number of different shapes that can be cut out of the metal tab (112). Other embodiments may include a knife, a letter opener, a screwdriver, a nail file, a ruler, a hex nut wrench, a guitar pick, etc. Many such variations can be envisioned by those having ordinary skill in the art.

In some embodiments, the metal tab (112) can even be used together with the magnets as an earbud holder. For example, the removable magnet can be stacked on the permanent magnet (106) and the hook end (114) of the metal tab (112) can be connected to the removable magnet. Next, the two ear buds are inserted to rest in the nook of the bottle opener cutout at the other end of the metal tab (112). Then the end of the tab with the earbuds is spun with one finger, similar to a crank, which causes the wire of the earbuds to wind up around the removable magnet. Finally, the metal tab (112) is flipped so the wire is trapped between the hook end (114) and the magnet.

In addition to the above mentioned functions, the tab can also serve as a clip that is powerful enough to clip it to lamp shades, beer mugs, book covers, belts/pants, etc. One way to achieve this is to stack the permanent (106) and removable magnets, lay the center of the metal tab (112) on the top magnet so the hook (114) is facing toward the phone, then press the other end of the metal tab (112), which causes the hook end (114) to lift up and snap back such that some kind of material can be caught between the hook end (114) and the back surface (102) of the cell phone case.

Figure 2:
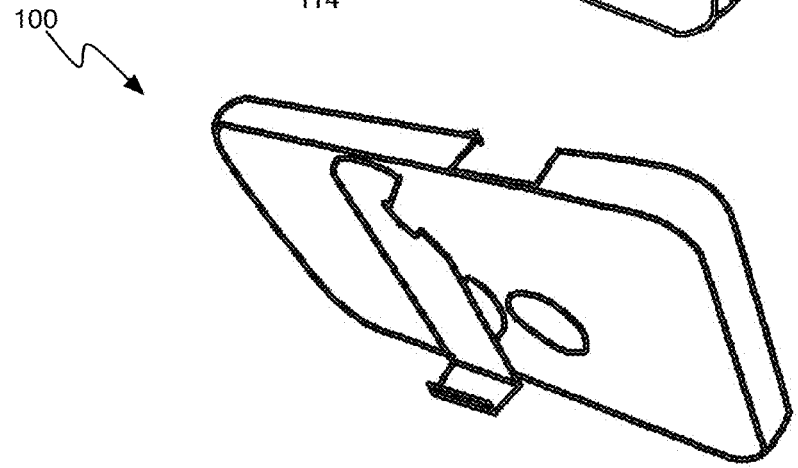
FIG. 2 shows a cell phone case in accordance with one embodiment, in which the cell phone case stands up at a second angle.
Figure 3:
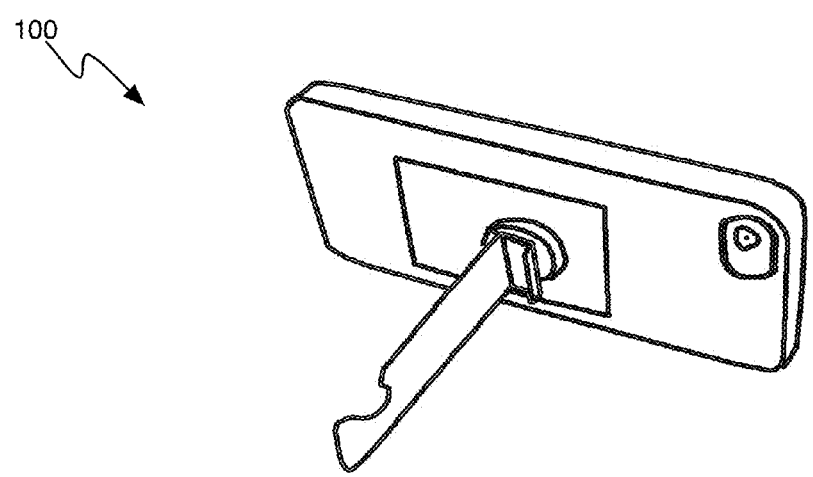
FIG. 3 shows a cell phone case in accordance with one embodiment, in which the cell phone case is supported by the metal tab when standing up.

Since the metal tab (112) attaches to the permanent magnet (106) through magnetic forces, the metal tab (112) can also slide with respect to the permanent magnet (106). This allows the cell phone case (100) to be propped up by the metal tab (112) at different angles, so as to reduce glare and allow better visibility of the cell phone screen by a user. FIG. 1 shows how the cell phone case (100) stands up at a first angle, which is close to vertical, while FIG. 2 shows a different position in which the cell phone case (100) is more reclined. FIG. 3 shows another way in which the metal tab (112) can be used to support the cell phone case (100). In this embodiment, the permanent magnet (106) is attached to the hook (114) of the metal tab (112) rather than to its main portion. This may provide for even further viewing angles of the cell phone screen.

Figure 4:
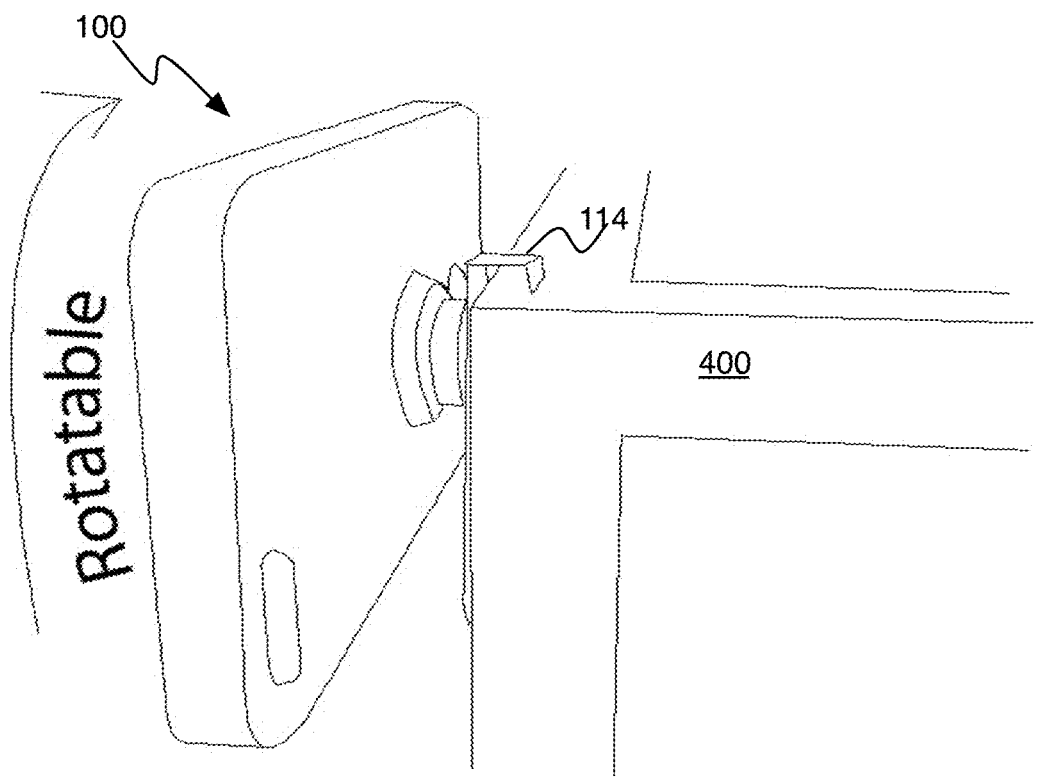
FIG. 4 shows how the hook of the metal tab is used to hang the cell phone case from a surface, in accordance with one embodiment.

FIG. 4 shows how the hook (114) of the metal tab (112) can be used to hang the cell phone case (100) from a surface (400), such as a table, cabinet, or the like.

Figure 5:
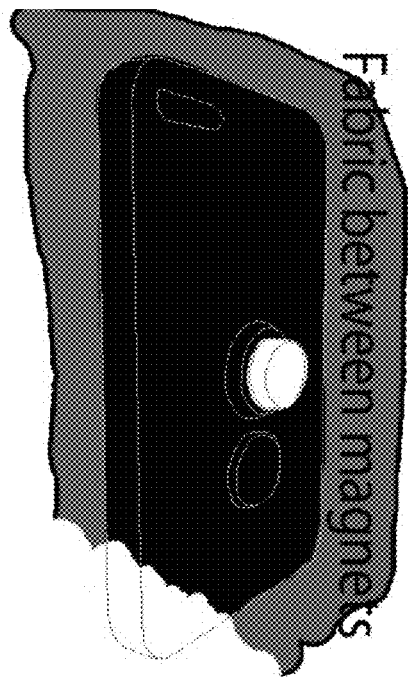
FIG. 5 shows how the removable magnet is removed from its opening and is used to attach, for example, through a layer of fabric, to the permanent magnet, in accordance with one embodiment.

FIG. 5 shows how the removable magnet (108a) can be removed from its opening (108) and be used to attach, for example, through a layer of fabric (500), to the permanent magnet (106). This allows a user to attach the cell phone case (100) to various items of clothing, for example, for outdoor use or hands free operation, as will be discussed in further detail below.

Figure 6:
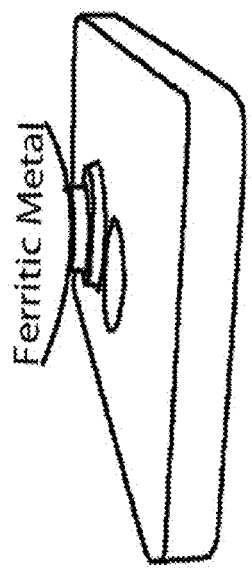
FIG. 6 shows how the permanent magnet is used to attach the cell phone case to a ferric metal, which allows hands free operation of the phone, in accordance with one embodiment.

FIG. 6 shows how the permanent magnet (106) can be used to attach the cell phone case (100) to any type of ferric metal (600), which allows hands free operation of the phone, for example by attaching it to visible or invisible metal objects, such as railings, cars, drywall screws, bullnose, etc., as will be discussed in further detail below.

Figure 7:
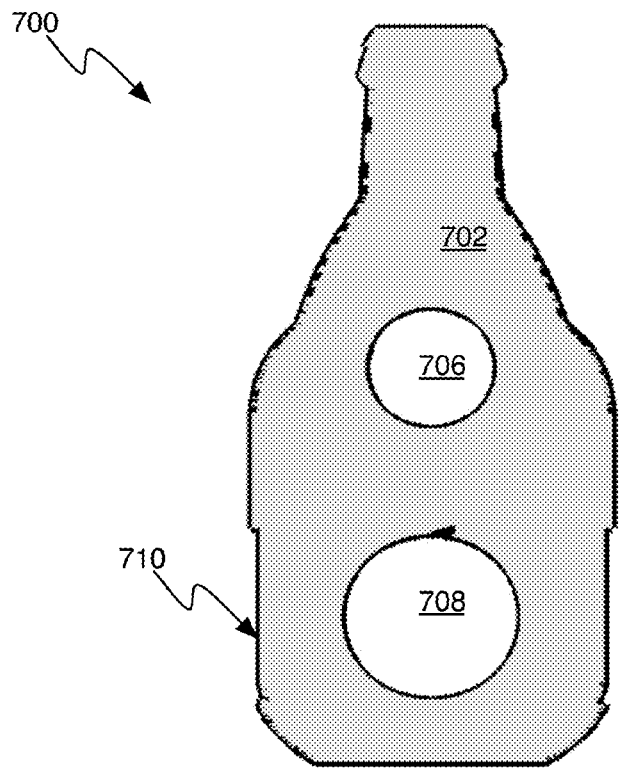
FIGS. 7-8 shows another embodiment of a cell phone case.
Figure 8:
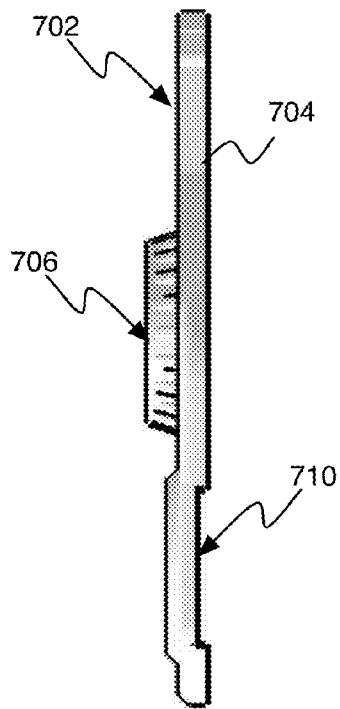

FIG. 7 shows another embodiment of a cell phone case (700). This embodiment of the cell phone case (700) share the same basic features that are included on the cell phone case (100) shown in FIG. 1. That is, the cell phone case (700) includes a back surface (702) and side surfaces (704). However, the side surfaces (704) do not wrap around the cell phone, as is the case with the cell phone case (100) of FIG. 1. Instead, the cell phone case (700) can be attached to the back of the cell phone, for example, using some kind of adhesive. Just like the cell phone case (100) in FIG. 1, the cell phone case (700) illustrated in FIGS. 7 and 8 have a back surface (702) with a permanent magnet (706) and an opening (708) for holding a detachable magnet (not shown). The side surface (704) has a slot (710) into which the metal tab (not shown) can be placed when not in use. The same functionality that was discussed above with respect to the cell phone case (100) of FIG. 1 can be achieved with the cell phone case (700) of FIGS. 7 and 8.

By having a case (700) that does not wrap around the cell phone, it is possible to design various shapes of the case that may be pleasing to a user. For example, the case (700) shown in FIGS. 7 and 8 has the shape of a bottle. However, as the user realizes, the various geometrical shapes that can be made are essentially limitless. This is also true for any colors and prints (e.g., various types of text, logotypes, etc.) that can be applied to all the various embodiments of the cell phone cases (100, 700).

Either of the embodiments described herein may include a separate back plate made from a ferritic material. The back plate can include one or more magnets that are placed at corresponding positions to the magnets on the cell phone case (100). By using such a back plate along with the cell phone case (100), a more stable attachment of the cell phone case (100) can be achieved, in particular when the back plate and cell phone case are placed on different sides of some kind of material, like fabric, as will be discussed in further detail below. In order to achieve this stability, it is preferred that the back plate includes three or more magnets. In some embodiments, these magnets are arranged in a geometrical pattern, such as, for example, the corners of a square or a triangle to achieve the desired stability.

Additionally, if the magnets on the back plate and the cell phone case (100) are equally spaced from each other, e.g., if they are located on the corners of an equilateral triangle or the corners of a square, this allows the cell phone case (100) to be turned at predetermined angles with respect to the back plate. For example, in the case of a triangular pattern, the cell phone case can be positioned in any of three positions that are approximately 60 degrees apart, and in case of a square pattern, the cell phone case can be positioned in any of four positions that are approximately 90 degrees apart, and so on. More magnets, symmetrically arranged, allow for an even larger amount of possible positions.

In some embodiments, the back plate is made to have the same shape as the cell phone, and can thus change the skin color of the back of the cell phone. In yet further embodiments, the back plate can also shaped to serve as a container (or have pockets of different sizes and shapes) to hold, for example, money, keys, memory cards, electronic cigarette lighters, multi tools, or other miscellaneous items, etc.

In one embodiment, the back plate is made out of metal, which creates a number of unique abilities. For example, one such ability is the ability for the metal tab (112) to connect anywhere on the plate. This allows many more angle options especially in portrait orientation, as well as weight balancing. As will be discussed below, with pocket-less weak-fabric items of clothing (such as, athletic shorts for biking and running), it is common that a user wants the phone on her tailbone. This can be sturdily accomplished by trapping the drawstring axially between the two magnets that are both connected to the plate.

Manufacturing the Cell Phone Case

The cell phone case can be manufactured from a wide range of materials. Some examples include wood, metal, glass, concrete, epoxy and most strong forms of plastic. Those people having ordinary skill in the art of manufacturing things from these materials can readily figure out how to manufacture a cell phone case in accordance with the above description.

Some embodiments of the cell phone case can be manufactured by so-called 3D printing. This allows for a high degree of customization of the cell phone case to fit various types and models of cell phones. Some examples of suitable materials that can be used for 3D printing include nylon, polylactic acid (PLA), high impact polystyrene (HIPPS), polycarbonate (PolyCarb), acrylonitrile butadiene styrene (ABS), grapheme, Kevlar, fiberglass, carbon fiber, and even some kinds of paper.

Yet other embodiments of the cell phone case can be manufactured using injection molding. Such a solution may be suitable for en-mass production, but may not provide the same degree of customization as 3D printing, as the skilled person realizes.

Exemplary Uses of the Cell Phone Case

The cell phone case in accordance with the various embodiments described herein can be used in many ways. Below are some examples, some of which are also illustrated in the attached drawings. Many further uses can be envisioned by those having ordinary skill in the art.

Phone Stand:

By sliding the metal tab out of the cellphone case and attaching it to the magnet on the back, the cell phone case can be stood up on a surface, either in a "landscape" configuration or in a "portrait" configuration. Depending on the length of the tab, the tab can be slid along the magnet, such that the cellphone case can be tilted back at an angle, if so desired, for example, to reduce glare on the cellphone screen. Some examples of the cell phone stand are illustrated in FIGS. 1-3, as discussed above.

Hanging the Phone for Selfies and Video Conferencing

By pulling the metal tab out of the phone case and attaching the hook end of the tab to a textured surface, while having the opposite end attached to the magnet on the back of the cellphone case, the cellphone case can be hung from various objects. For example, the cellphone case can be hung from a branch, a windowsill, a kitchen cabinet, or any object to which the hook portion of the metal tab can attach. The cellphone case can also be rotated to a desired roll angle—e.g. portrait, landscape, or anywhere in between. One example of this is shown in FIG. 4, as discussed above.

Sometimes, it may be useful to flip the metal tab, such that the bent portion of the metal tab faces the front of the phone. This can possibly give the user a more desirable field of view for either the front-facing or rear-facing camera of the cellphone.

Hands Free Video Recording

The two magnets can be attached on different sides of some kind of material, such as the user's shirt, sleeve, pant waist, etc., or even thicker fabrics, such as a scuba wet suit, a kayak dry suit, snowboard/ski pants, a skydiving jumpsuit, etc. The strength of the magnets allows the cellphone case and the phone to be used in a hands-free configuration, either to record video or to take regular pictures. One example of this is shown in FIG. 5.

Again, when attached to the user's fabric, the phone can be rotated to enable the camera to capture images at any desired angle, or to aim the microphone of the cell phone in a particular desired direction, to achieve better sound quality.

Hands Free Picture and Video Using Magnetic Connection:

Another option for hands free picture and video recording uses a single magnet only. For example, in an indoor situation, almost all corners in a house or building use ferrous metal corner trim or bullnose, to which the magnet on the back of the cell phone case can be stuck. Alternatively, the magnet can be stuck to any hidden ferrous material, such as hidden drywall screws, for example. Stick the magnets together for more power to connect to small nails or screws in the wall. In an outdoor setting there are objects, such as cars, parking meters, deadbolts, pipes, metal signs, railings, and metal trim that can be used in a similar fashion. One example of this is shown in FIG. 6.

Stud Finder:

The cellphone case can also be used as a stud finder, by simply sliding the cell phone case across a wall (with the magnets facing the wall). The magnets will be attracted to the drywall screws that go into the studs, and thereby indicate the location of the studs.

Hands Free Flashlight:

For cell phones that have a flashlight function, the flashlight can be turned on and the cell phone case can then be stuck, set, hung, etc., to be used as a hands free flashlight. Some example uses include using the flashlight in a tent, under a car, or on the chest or the sleeve of a user's shirt. For example, the flashlight app can be used together with the cell phone case attached to the front waistline of a user's shorts or to the user's belt buckle and be used as a hands free flashlight when rollerblading or walking in the dark.

Mirror

For cell phones that only have a rear-facing camera, the metal tab can be made shiny, such that it can be used as a mirror. When attached to the back of the cell phone case, if the user can see her reflection in the metal tab, then the user will know that the rear facing camera can see her as well. This makes it significantly easier to take "selfies" with a rear-facing camera and avoids the guesswork that must happen these days when the user cannot know for sure exactly where the camera is aimed.

Applications for Vehicles

The cellphone case's magnets can connect, for example, on the dashboard of a car to any ferrous metal or to any A/C car vent. Also, when the vents are facing up, the metal tab can hang from the vents. Attaching a ferrous disk anywhere to the interior of the car can provide a "docking station" anywhere in the car that can be used as a viewing station, for example, for movies or various types of streaming content, etc. For example, connecting the phone to a sun visor through the magnet or tab can work as a viewing station for everyone in the car, since the cars sun visors can be moved to most any position.

Connecting the cellphone and case to the car can also provide a nice dashboard camera to record videos of races, passengers/drivers faces, and the general environment at different angles. Since the cell phone can connect securely to the car, it is also possible to accurately use any G-force/accelerometer application on the phone. Various cell phone apps can also be developed, for example, such that the user may enter the car's weight, and the cellphone can use this data along with accelerometer data to calculate and display, for example, the car's horsepower to a user. Other types of apps may allow the user to see their lateral-G rating live around corners, acceleration, deceleration, just to mention a few examples.

Various Outdoor and Under-Water Applications

Many modern cell phones are waterproof, and as the technology develops, they will be rated at deeper and deeper depths. Many modern cell phones also contain various types of biometric meters, such as infrared heart rate monitors, finger prints scanners, etc. Other types of sensors that can interface with cell phones are also being developed, such that cell phones soon enough can be used for an even wider variety of applications, for example, testing the salinity of oceans, the PH of water, the PPM mineral content in a hydroponic system, etc. Thus, having a way to easily connect a cell phone to a scuba tank, a boat hull, a diving suit, etc., will allow some esoteric but elegant solutions for these types of technologies. This can be achieved using the magnets and/or tab on the cellphone case in accordance with the various embodiments of the invention.

Another area of use relates to orienteering. Some orienteering apps require no satellite connection, but just a gyro meter in the cell phone to map out the user's journey from a fixed starting point. This can allow divers, for example, to follow a pre-plotted course through caves and through wrecks and reefs without requiring a dive master to lead them. Hands free is a must when diving and having a "diving phone" connected to the stomach of the diver's suit by magnets allows continuous videography of the diver's journey and for the diver to see/navigate her course live, and can also allow the diver to get audible or tactile safety pings when she gets to deep, fails to take a decompression stop or gets to a crossroad or point of interest.

Yet another outdoor use relates to exercising. Listening to music while biking, running, walking, etc., usually requires ear buds. However, having a speaker cell phone (or dual speakers, for example) connected horizontally to ones waistline can also be satisfyingly functional as far as sound and comfort goes, as the cell phone does not bounce or seem annoying like it might when the cell phone is swinging in the pocket of the user's running shorts.

Space Saving Applications

Since the cellphone case is capable of sticking to a laptop, a fridge, or even the an outlet that is used when charging the cell phone, it is possible to avoid cluttering up a table or other surface, and/or possibly getting the cell phone dirty and damaged as might be the case if the cellphone was sitting on the floor while charging.

Clothing Applications

In some embodiments, magnets can be sewn to the inside of clothing items, or be attached as decorative items (stars, hearts, moons, etc.) to the outside of clothing items, and function as attachment points for the cellphone case. In some embodiments, the magnets can be fashionably coated or colored. In fact, the magnets can be coated with essentially anything to achieve a fashion aspect and can be in most any shape, as long as there is sufficient strength to properly hold the cellphone case.

Security Camera/Baby Monitor:

There are many motion applications and even face recognition applications that allow the cellphone to record or take a picture when there is movement or when the cellphone recognizes an object as human. Because the cellphone can be connected to many hidden places, one could rest assured that anyone who goes past something of value will have their picture taken and automatically sent to cloud storage to view from anywhere. Many cellphone cameras are also able to see in infrared. This will allow nighttime security shots with no light or sound. Video surveillance can be easily conducted considering all the overhead nooks and crannies to which this attachment system can connect. Similar apps can be used by parents to monitor their sleeping newborn, even if the room is dark, without requiring them to invest in separate baby monitoring equipment.

Figure 9:
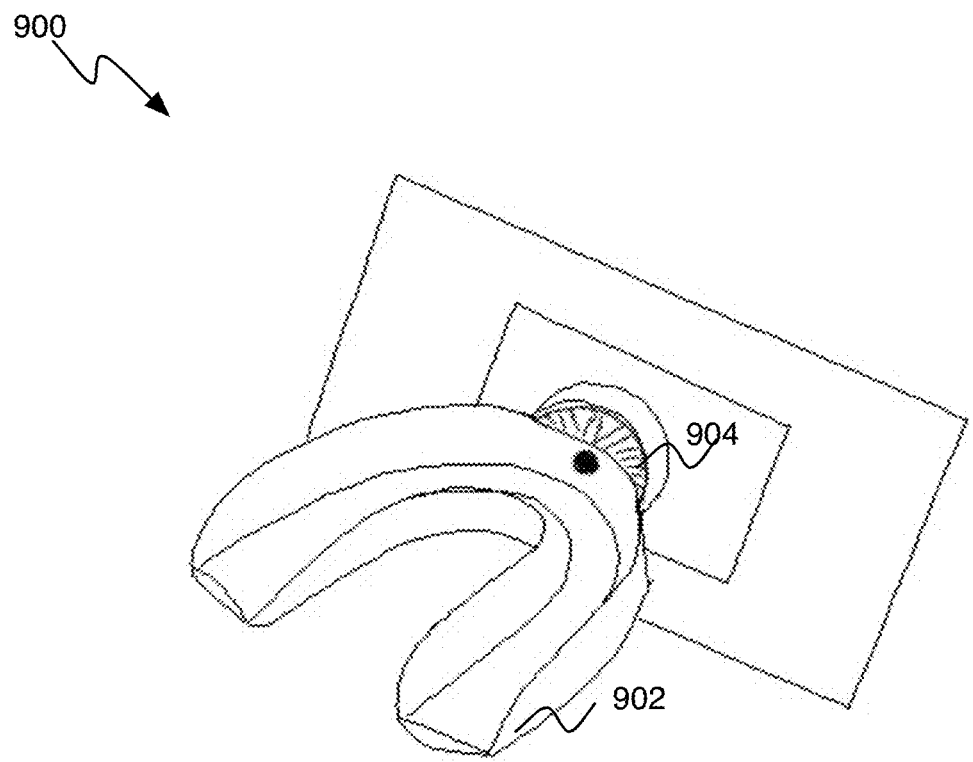
FIG. 9 shows how the cell phone case can be used as a "mouthcam," in accordance with one embodiment.

Mouthcam:

In some embodiments, the cell phone case can be used in conjunction with a mouth guard, as illustrated in FIG. 9, in order to be used as a "mouthcam" (900). The mouth guard (902) has a metal plate (904) attached in the front, by a rivet, screw, glue, hook-and-loop (Velcro) fastener, tape, or the like. When a user connects a metal plate to the back of the permanent magnet and then connects the metal plate to the metal plate (904) on the mouth guard, the two metal plates will adhere stronger than usual because the metal plate on the cell phone case and the metal plate (904) on the mouth guard (902) are compressing the flux lines, similar to a cup magnet, making it 2-3 times stronger. The mouth guard cam (900) has a unique safety feature in that it is able to detach from the mouth guard (902) in the event of an accident, to protect the teeth, lips, face, etc. This is something that cannot be accomplished with a fixed mount. Further, the mount also allows the cell phone case to rotate 360 degrees, allowing for all types of video capture.

Miscellaneous

Some cell phone applications allow the users to set timers and to shoot a burst of pictures. These can be used, for example, to capture pictures when working on improving various sporting techniques. For example, a golfer can attach their cell phone to their golf cart, set up a 5 second burst mode with an audible 10-second timer, and get 50 shots of his golf swing. The photos can later be used to analyze what went well with the golf swing and what needs to be improved. For example, the user may have looked up before he hit the ball, his shaft was maybe whipping prematurely so he might need to get a harder one, or his left arm was not straight, etc. The same techniques can be used for tennis swings, diving form/flips, gymnastic tumbling, etc., and sometimes the user may even wish to select the best action selfie among a bunch of selfies to publish it on Facebook or any other kind of social media.

In some embodiments, the metal tab (112) can slide in between roof shingles, such that the cell phone case and cell phone can be used as a security cam. The metal tab (112) can also slide in between books, or any gap such as a car dashboard, CD player slot, or even the flash mount of a video camera to attach the cell phone and use it as a teleprompter.

CONCLUDING COMMENTS

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. It should also be noted that the terms cellphone, cellphone case, case, phone, etc., have been used interchangeably throughout the specification, in particular when describing the various uses of the cell phone case with a cell phone inserted. However, just to be clear, it should be noted that no modifications need to be made to the cell phone itself. All operations described above with respect to the metal tab and/or the magnets pertain to operations that are performed using the cell phone case, with or without a cell phone inserted into the case itself. Further, while the above cases and operations have been described with reference to a cellphone, it should be clear to those of ordinary skill in the art that the same principles can be applied to any case that is capable of holding an electronic device.

The invention claimed is:

1. A case for an electronic device having a front face, a rear face, a top edge, a bottom edge, and two side edges, the case comprising:
 a body for covering at least a portion of the rear face of the electronic device, and comprising a plurality of fastening portions configured to fasten the mobile device to the case;
 a metal tab, the metal tab being insertable through a slot in the body to rest between the body and the electronic device when inserted through the slot;
 one or more magnets that are permanently attached to the body; and
 one or more removable magnets, wherein at least one removable magnet is configured to attach by a magnetic force to the metal tab when the metal tab is inserted into the slot, thereby holding the removable magnet in place with respect to the body; and
 a ferritic metal back plate including one or more magnets that are configured to attract to the one or more magnets that are permanently attached to the body and to the one or more removable magnets, so as to enable the back plate and the body to attach by magnetic force through some material.

2. The case of claim 1, wherein the metal tab is bent into a hook at a first distal end.

3. The case of claim 2, wherein the metal tab is configured to attach by magnetic force to one of the permanent magnets, so as to enable the electronic device to be suspended from an object, using the hook at the first distal end of the metal tab.

4. The case of claim 2, wherein the metal tab is configured to attach by magnetic force to one of the permanent magnets, so as to enable the electronic device to stand up at any angle between a minimum and a maximum angle on a flat surface of an object, using the hook at the first distal end of the metal tab as a support.

5. The case of claim 1, wherein a second distal end of the metal tab is shaped into a utility tool.

6. The case of claim 5, wherein the utility tool includes one of: a bottle opener, a knife, a nail file, a screwdriver, a ruler, a letter opener, an earbud holder, and a clip.

7. The case of claim 1, wherein at least one of the permanent and removable magnets is a neodymium iron boron magnet.

8. The case of claim 1, wherein the back plate has three or more points with a magnet located at each point, so as to allow the material to be captured between the points of the back plate, thereby stabilizing the attachment of the body to the back plate.

9. The case of claim 8, wherein the back plate is in the shape of an X, so as to allow the material to be captured between the four corners of the X, thereby stabilizing the attachment of the body to the back plate.

10. The case of claim 1, wherein the one or more magnets of the back plate are arranged at equal distances from each other.

11. The case of claim 1, wherein the body is made from one of: wood, metal, glass, concrete, epoxy, plastics, nylon, polylactic acid, high impact polystyrene, polycarbonate, acrylonitrile butadiene styrene, grapheme, Kevlar, fiberglass, carbon fiber, and paper.

12. The case of claim 1, wherein the electronic device is a cellular telephone.

* * * * *